UNITED STATES PATENT OFFICE.

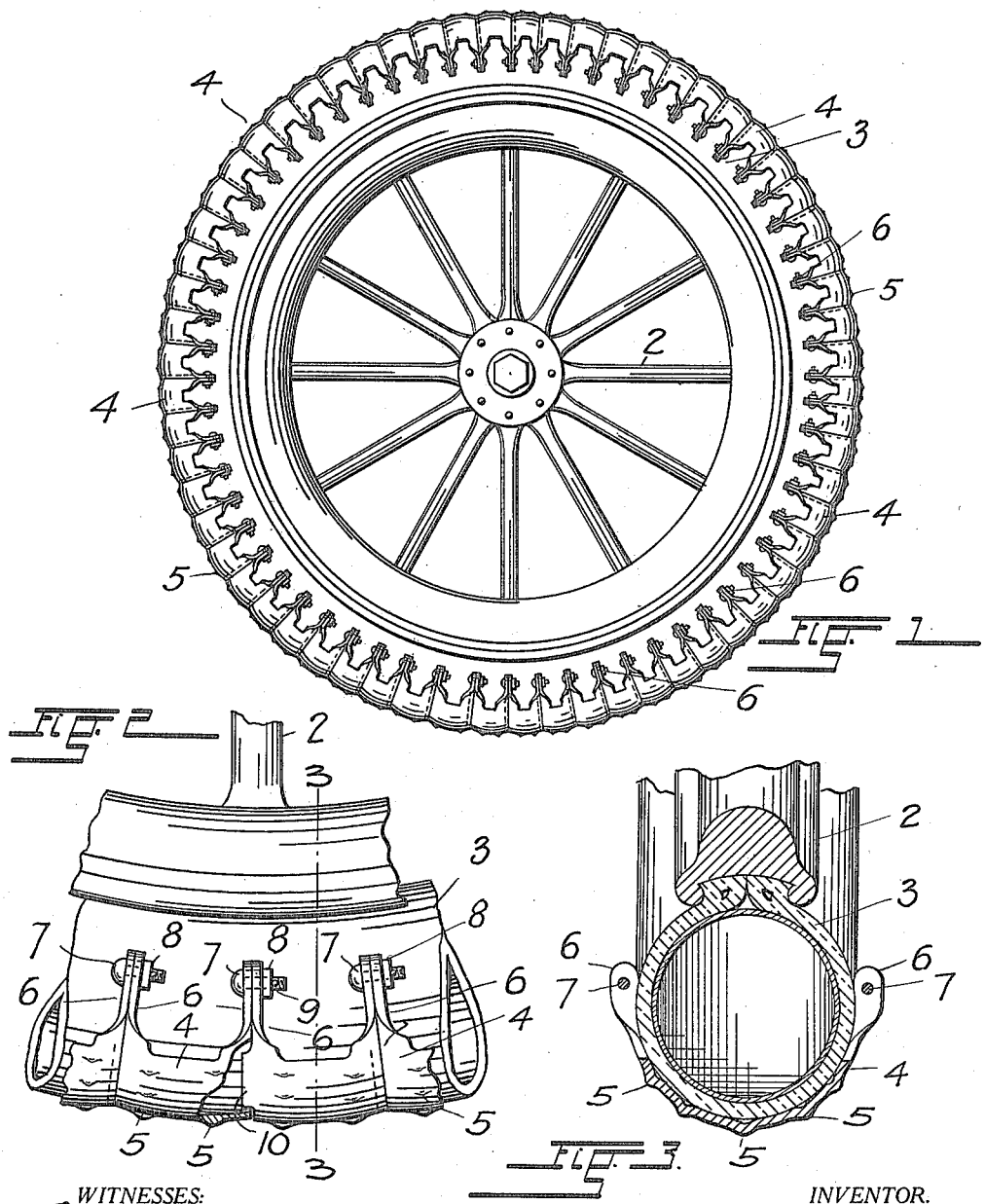

ARNOLD J. MOONEN, OF DENVER, COLORADO.

PROTECTIVE TIRE-COVERING.

1,164,545.	Specification of Letters Patent.	Patented Dec. 14, 1915.

Application filed January 8, 1915. Serial No. 1,113.

*To all whom it may concern:*

Be it known that I, ARNOLD J. MOONEN, a citizen of the United States, residing at Denver, in the county of Denver and State of Colorado, have invented certain new and useful Improvements in Protective Tire-Coverings, of which the following is a specification.

This invention relates to protective coverings for resilient tires, and its principal object resides in the provision of a circular, interiorly concave, metallic armor of simple construction which, when applied to a tire, will protect its tread against wear and punctures and prevent its skidding on slippery surfaces without detrimental effect upon its resilient qualities, and without the degree of frictional heat produced in the use of leather coverings.

An embodiment of my invention is illustrated in the accompanying drawings in the various views of which like parts are similarly designated, and in which, Figure 1 represents an elevation of a wheel to the tire of which the protective covering has been applied, Fig. 2, an elevation of a portion of the wheel tire and the covering, drawn to an enlarged scale, and Fig. 3, a section taken along the line 3—3, Fig. 2.

Referring to the drawings by numerical reference characters, 2 designates a wheel which upon its felly carries a flexible tire 3. The protective covering which in the drawings is shown around the tread of the tire, consists of a band composed of a series of links or units 4 of the same form and construction.

Each of the units is composed of a U-shaped stirrup made of steel or other durable and wear-resisting material which at the ends of its longitudinal edges has four lugs 6 for its attachment to the next adjoining units of the series.

The units are made sufficiently light to insure a limited degree of flexibility, and their outer surfaces are slightly curved longitudinally and provided with projections 5 formed by indenting the metal at its inner surface, to present a roughened or nonskidding tread for the tire to which the covering is applied.

The lugs at the ends of the units are formed by twisting the outer ends of arms formed integral with their curved body portion at right angles to the longitudinal axes of the same.

The lugs have in their said end portions, holes for the reception of bolts 7 by which the units are connected.

When the series of units of which the cover is composed are assembled, the bolts are inserted through the registering openings of the contiguous lugs of adjoining units. Nuts 8 screwed onto the threaded end portions of the bolts, secure the units together, and cotters 9 driven into transverse openings in the ends of the bolts prevent displacement of the nuts.

The units are furthermore provided at one of the ends of their curved body portions with flanges 10 which are offset inwardly to enter adjoining ends of the next units as shown in Fig. 2 of the drawings, for the purpose of preventing the formation of gaps between the units when by the weight supported on the wheel to which the covering is applied, the lowermost portion of its tire is compressed. In this connection it should be understood that the arms which provide the lugs of the units are resilient to a degree sufficient to permit of a limited separation of the links of the band when the latter is subjected to radial pressure.

It will be observed that by virtue of the fact that all the units of the band are the same in form and construction, the dies or other appliances for producing one of the units, are all that is required to produce complete coverings of any desired diameter.

The coverings may therefore be made at a comparatively low cost, they can be readily changed to fit tires of different diameters, and in case of breakage they are quickly repaired by merely substituting a new unit for a damaged or broken one.

What I claim and desire to secure by Letters Patent is:

1. A protective covering for tires comprising a band composed of units each composed of a U-shaped body-portion having at the ends of its longitudinal edges apertured resilient lugs, and bolts connecting the corresponding lugs of adjoining sections.

2. A protective covering for tires comprising a band composed of units each composed of a U-shaped body-portion having at the ends of its longitudinal edges resilient lugs the end-portions of which are apertured and bent at right angles to the longitudinal axis of the body-portion, and bolts connecting the corresponding lugs of adjoining sections.

In testimony whereof I have affixed my signature in presence of two witnesses.

ARNOLD J. MOONEN.

Witnesses:
G. J. ROLLANDET,
L. RHOADES.

Copies of this patent may be obtained for five cents each, by addressing the "Commissioner of Patents, Washington, D. C."